(12) United States Patent
Miyata et al.

(10) Patent No.: US 7,404,596 B2
(45) Date of Patent: Jul. 29, 2008

(54) VEHICLE FRONT BODY STRUCTURE

(75) Inventors: Daizou Miyata, Odawara (JP); Fumitaka Uto, Komae (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 176 days.

(21) Appl. No.: 11/345,266

(22) Filed: Feb. 2, 2006

(65) Prior Publication Data
US 2006/0175873 A1 Aug. 10, 2006

(30) Foreign Application Priority Data
Feb. 4, 2005 (JP) ............................. 2005-028854

(51) Int. Cl.
*B62D 25/08* (2006.01)
(52) U.S. Cl. ................................. 296/203.02
(58) Field of Classification Search ............ 296/203.02, 296/203.01, 187.03, 187.09, 187.1, 193.09, 296/29, 30; 180/232
See application file for complete search history.

(56) References Cited

U.S. PATENT DOCUMENTS 6,216,309 B1 * 4/2001 Goto et al. ............... 15/250.31
7,004,534 B2 * 2/2006 Yoshii et al. ................. 296/192
2003/0205916 A1 * 11/2003 Seksaria et al. ............. 296/192
2005/0217056 A1 * 10/2005 Kagawa et al. ......... 15/250.351
2006/0027993 A1 * 2/2006 Takayanagi et al. ... 280/124.166
2006/0070201 A1 * 4/2006 Ohe et al. ................... 15/250.3
2007/0215402 A1 * 9/2007 Sasaki et al. ................ 180/232
2007/0246971 A1 * 10/2007 Hanakawa et al. ...... 296/203.01

FOREIGN PATENT DOCUMENTS

| JP | 63-12479 U | 1/1988 |
| JP | 9-109929 A | 4/1997 |
| JP | 11-198853 A | 7/1999 |
| JP | 2000-085627 A | 3/2000 |
| JP | 2000-118443 A | 4/2000 |

* cited by examiner

*Primary Examiner*—H Gutman
(74) *Attorney, Agent, or Firm*—Foley & Lardner LLP

(57) ABSTRACT

A front body structure for a vehicle including: a cowl box extending in a transverse direction of the vehicle and having a curved shape with its central portion in the transverse direction of the vehicle situated at a front end thereof; and a cowl top extension tying tops of strut towers, extending in front of the cowl box at a height substantially equal to that of each of the tops of strut towers, and having a curved shape with its central portion in the transverse direction of the vehicle situated at a rear end thereof. The cowl top extension and the cowl box are connected to each other at the central portions thereof.

5 Claims, 5 Drawing Sheets

VEHICLE FRONT BODY STRUCTURE

BACKGROUND OF THE INVENTION

1. Field of Invention

The present invention relates to a front body structure for a vehicle that improves the rigidity of the vehicle without increasing weight thereof.

2. Description of Related Art

During traveling of a vehicle, strut towers bear loads from suspension to have tops of the strut towers flex towards and away from each other in a transverse direction of the vehicle (hereinafter, referred to as inward flexing). The strut tower exhibits the rigidity sufficient to avoid the inward flexing.

In the vehicle structure disclosed in Japanese Patent Application Publication No. 9(1997)-109929, a cowl box strides over the tops of the left and right strut towers to improve the rigidity of the strut towers against the inward flexing.

In other type of the vehicle body structure, the tops of the left and right strut towers are tied to each other with a strut bar. The strut bar is formed in a downwardly opening C shape in front view, striding over the engine and the like in the engine room, which has a pair of legs extending upward from the respective tops of the left and right strut towers and a connecting portion extending horizontally in the transverse direction of the vehicle and connecting upper ends of the leg portions.

SUMMARY OF THE INVENTION

In the former type of structure, it is difficult to maintain the vertical clearance between the cowl box and the hood. In order to have the downward load onto the hood efficiently absorbed, the hood has to be provided at a higher position to make the clearance larger. This may decrease the flexibility in the design of an engine room.

In the latter type of structure, since the strut bar has a C shape, the strut bar is likely to elastically deform when the load in the longitudinal direction of the strut bar is exerted thereon from the tops of the strut towers. Therefore, the rigidity of the tied left and right strut towers needs to be further enhanced, for example, by increasing the thickness of the strut bar resulting in the weight increase.

It is an object of the invention to provide a front body structure for a vehicle, which increases the flexibility in the design of the engine room and improves the rigidity of the vehicle body while contributing to the weight reduction thereof.

An aspect of the present invention is a front body structure for a vehicle comprising: a cowl box extending in a transverse direction of the vehicle and having a curved shape with its central portion in the transverse direction of the vehicle situated at a front end thereof; and a connecting member tying tops of strut towers, extending in front of the cowl box at a height substantially equal to that of each of the tops of strut towers, and having a curved shape with its central portion in the transverse direction of the vehicle situated at a rear end thereof, wherein the connecting member is connected to the cowl box at the central portion thereof.

BRIEF DESCRIPTION OF THE DRAWINGS

The invention will now be described with reference to the accompanying drawings wherein.

DETAILED DESCRIPTION OF THE PREFERRED EMBODIMENT

Figure 1:
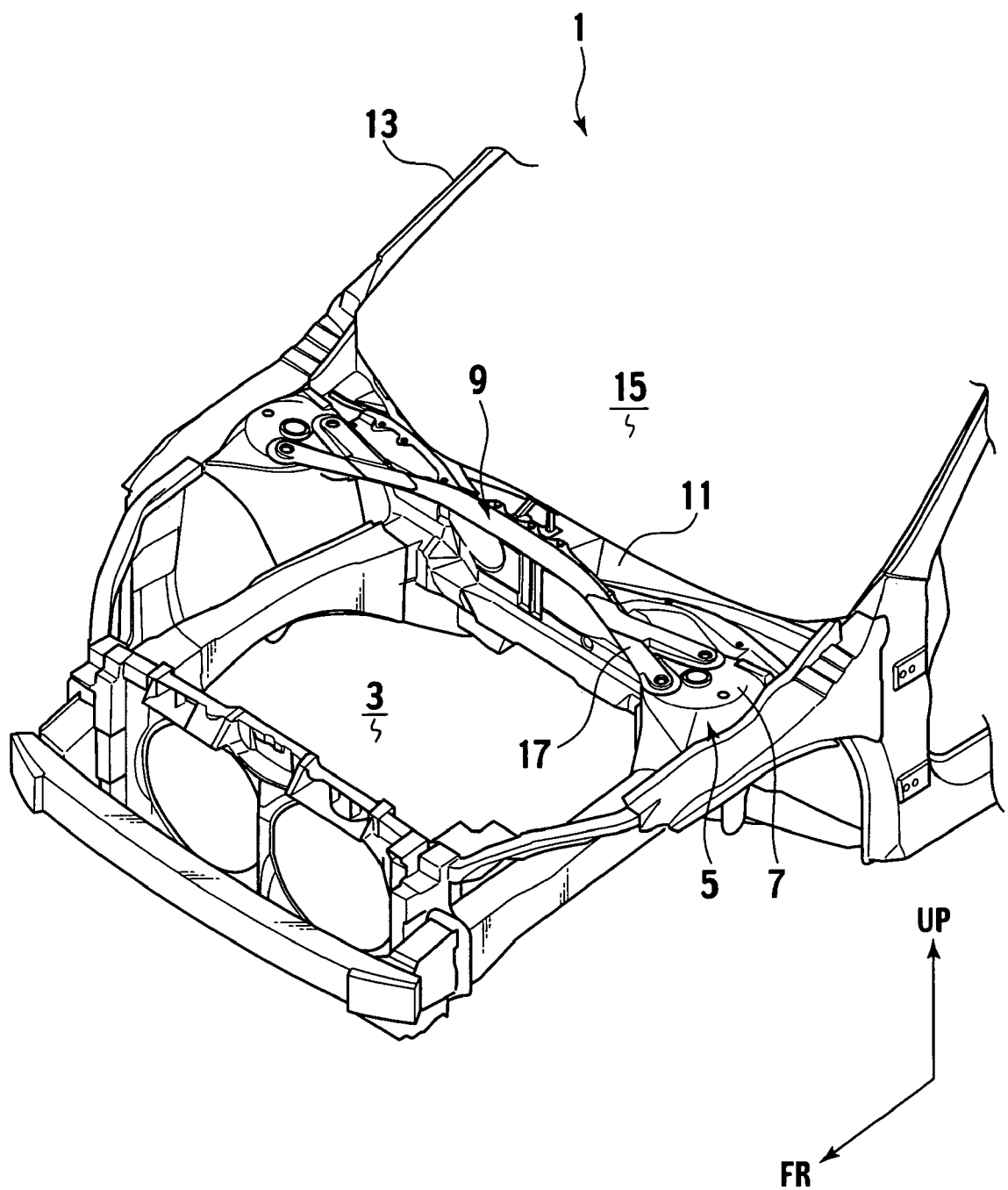
FIG. 1 is a perspective view of a front body structure for a vehicle according to an embodiment of the invention.

Embodiment of the present invention will be explained below with reference to the drawings, wherein like members are designated by like reference characters.

An engine room 3 is formed in a front portion of a vehicle body 1. The rear portion of the engine room 3 is provided with strut towers 5 at both ends in the transverse direction of the vehicle thereof. Those left and right strut towers 5 are tied to each other at the respective tops (upper sides) 7 thereof by a cowl top extension 9 functioning as a strut tower brace or a strut tower connecting member. A cowl box 11 is provided along a front lower edge of a windshield 15 and to the rear of the cowl top extension 9, and is joined to right and left front pillars 13. The windshield 15 is installed on the vehicle body 1 with the front lower edge thereof supported by the cowl box 11 and both sides in the transverse direction of the vehicle thereof by the front pillars 13.

Figure 2:
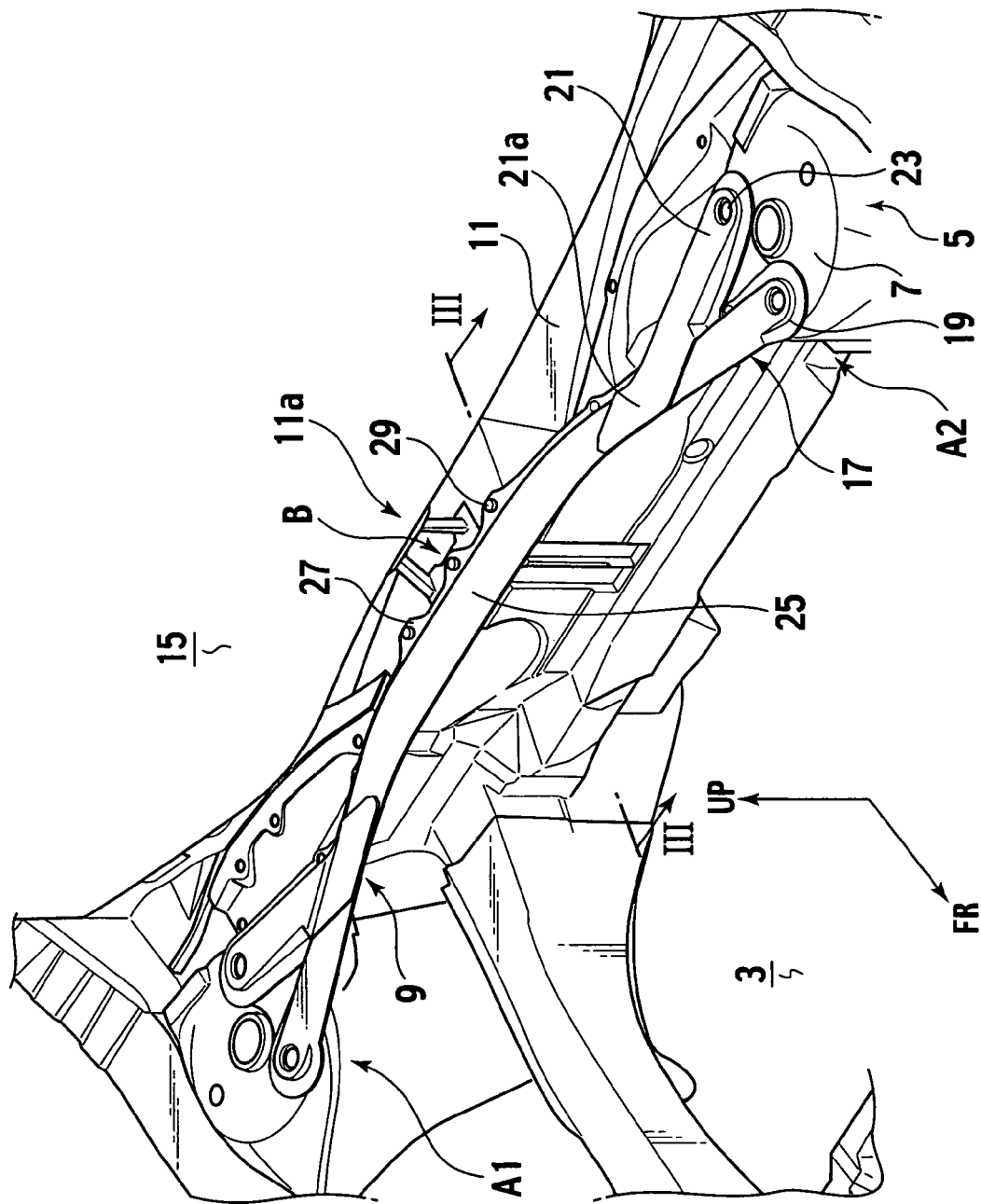
FIG. 2 is a perspective view of an enlarged essential portion of the vehicle front body structure of FIG. 1.

As shown in FIG. 2, the cowl top extension 9 extends in substantially a horizontal direction across the width of the vehicle at substantially the same height as that of the tops 7 of the strut towers 5. That is, the cowl top extension 9 has substantially a linear configuration in front view extending between connecting portions A1 and A2 at which the cowl top extension 9 is joined with the respective strut towers 5 at the tops 7 thereof.

The cowl top extension 9 is provided at the left and right connecting portions A1, A2 thereof with branching portions 17 each having two arms of a front attachment 19 which extends frontward and transversely outward from its branching point and is fixed to the front part of the top 7 of the strut tower, and a rear attachment 21 which extends rearward and transversely outward from its branching point and is fixed to the rear part of the top 7. The rear attachment 21 is welded to the front attachment 19 at its base portion 21a. Each of the front attachment 19 and rear attachment 21 is formed to have on a transversely outer end portion thereof a hole 23 through which a bolt is inserted to fasten the cowl top extension 9 to the top 7 of the strut tower.

The cowl top extension 9 is formed to have a closed cross section 37 along its entire length, and formed in a rearwardly curved shape having its central portion 25 in the transverse direction of the vehicle situated at the rear end thereof, and having a center of curvature at a point in front thereof. The cowl top extension 9 is joined with a central portion 11a of the cowl box 11 at a cowl box joint portion B at the central portion 25 of the cowl top extension 9. That is, the central portion 25 of the cowl top extension 9 is provided with three horizontal attachment flanges 27 extending rearward from its rear edge at predetermined intervals in the transverse direction of the vehicle. Each of the attachment flanges 27 is fastened to the central portion 11a in the transverse direction of the vehicle of the cowl box 11 using bolts 29, respectively (see FIG. 3).

Figure 3:
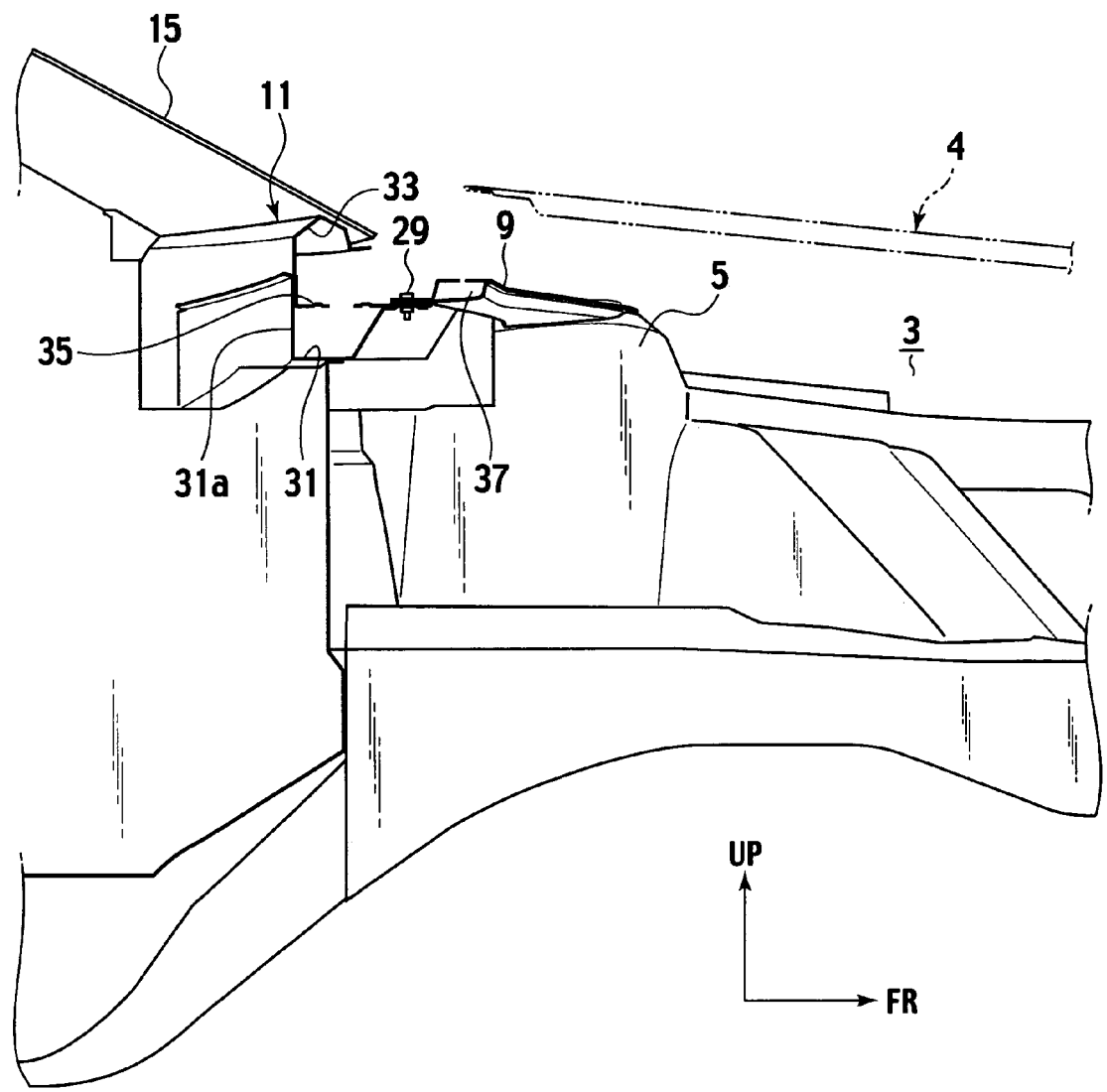
FIG. 3 is an enlarged cross sectional view of the vehicle front body structure taken along lines III-III of FIG. 2.

As shown in FIG. 3, the cowl box 11 is arranged in the rear of the cowl top extension 9 and extends in the substantially horizontal direction across the width of the vehicle and on substantially the same plane with the cowl top extension 9. The cowl box 11 is formed in a curved shape having its central portion 11a in the transverse direction of the vehicle situated at the front end thereof. The cowl box 11 is formed of a transversely extending dash upper panel 31 having a upwardly opening channel shape, provided at the lower side of the cowl box 11, a cowl top center panel 33 provided above the dash upper panel 31 and joined with a rear side wall 31a thereof, and a cowl top front panel 35 provided to close the upper opening of the dash upper panel 31. The attachment flange 27 of the cowl top extension 9 is set on the top of the front edge of the cowl top front panel 35 at the central portion 11a in the transverse direction of the vehicle of the cowl box 11, and is fastened thereto with the bolts 29.

The upper opening of the engine room 3 is covered with a hood 4.

Figure 4:
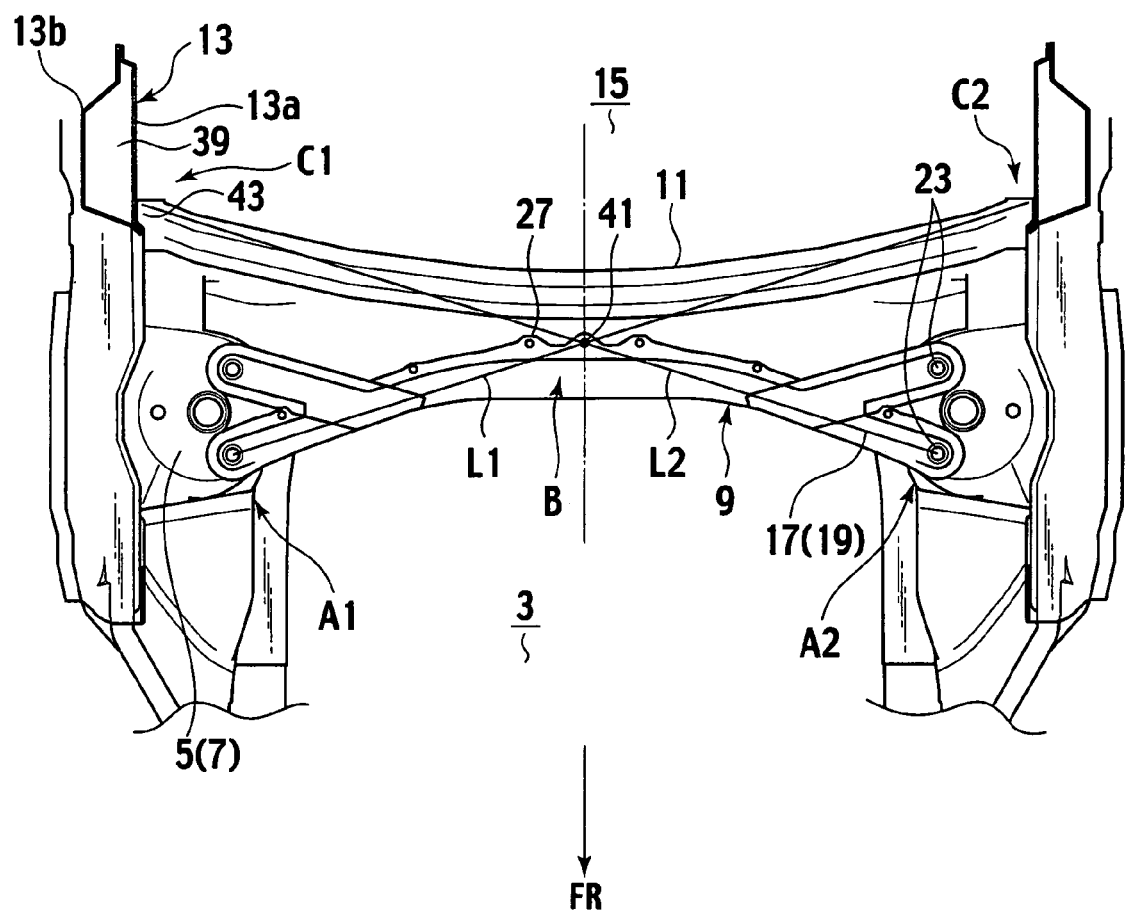
FIG. 4 is a plan view of the vehicle front body structure shown in FIG. 2.

As shown in FIG. 4, the vehicle body 1 is provided on both transversely outer sides thereof with a pair of front pillars 13. Lower end portions of those left and right front pillars 13 are connected to corresponding pillar connecting portions C1, C2 on both left and right end portions of the cowl box 11, respectively at predetermined joint portions 43 at both sides of the vehicle body 1. Each of the front pillars 13 includes an inner panel 13a and an outer panel 13b connected thereto, which collectively constitute a closed cross section 39.

The attachment holes 23 formed in the front attachment 19 of the cowl top extension 9, the bolt hole 41 of the flange 27, and the joint portions 43 at which the front pillars 13 are joined with the cowl box 11 are provided in substantially linear alignments, and the resultant lines cross with each other.

More specifically, the attachment hole 23 formed in the right front attachment 19 of the cowl top extension 9, the bolt hole 41 of the flange 27 for fastening the cowl top extension 9, and the left joint portion 43 at which the left front pillar 13 is joined with the cowl box 11 are arranged in a linear alignment on a straight line L1. Likewise, the attachment hole 23 formed in the left front attachment 19 of the cowl top extension 9, the bolt hole 41 of the flange 27 for fastening the cowl top extension 9, and the right joint portion 43 at which the right front pillar 13 is joined with the cowl box 11 are arranged in a linear alignment on a straight line L2. Those lines L1, L2 cross with each other at the point where the bolt hole 41 is formed in the flange 27.

The right strut tower connecting portion A1 of the cowl top extension 9, the cowl box connecting portion B of the cowl top extension 9, and the left pillar connecting portion C2 of the cowl box 11 are arranged substantially in a linear alignment, three-dimensionally on the same straight line. Likewise, the left strut tower connecting portion A2 of the cowl top extension 9, the cowl box connecting portion B of the cowl top extension 9, and the right pillar connecting portion C1 of the cowl box 11 are arranged substantially in a linear alignment, three-dimensionally on the same straight line.

In the embodiment, the branching portion 17 is formed at each of left and right end portions of the cowl top extension 9. However, the invention is not limited to the aforementioned structure. The ends of the cowl top extension 9 fixed to the tops 7 of the strut towers 5 may be in a shape without the branching arms.

Figure 5:
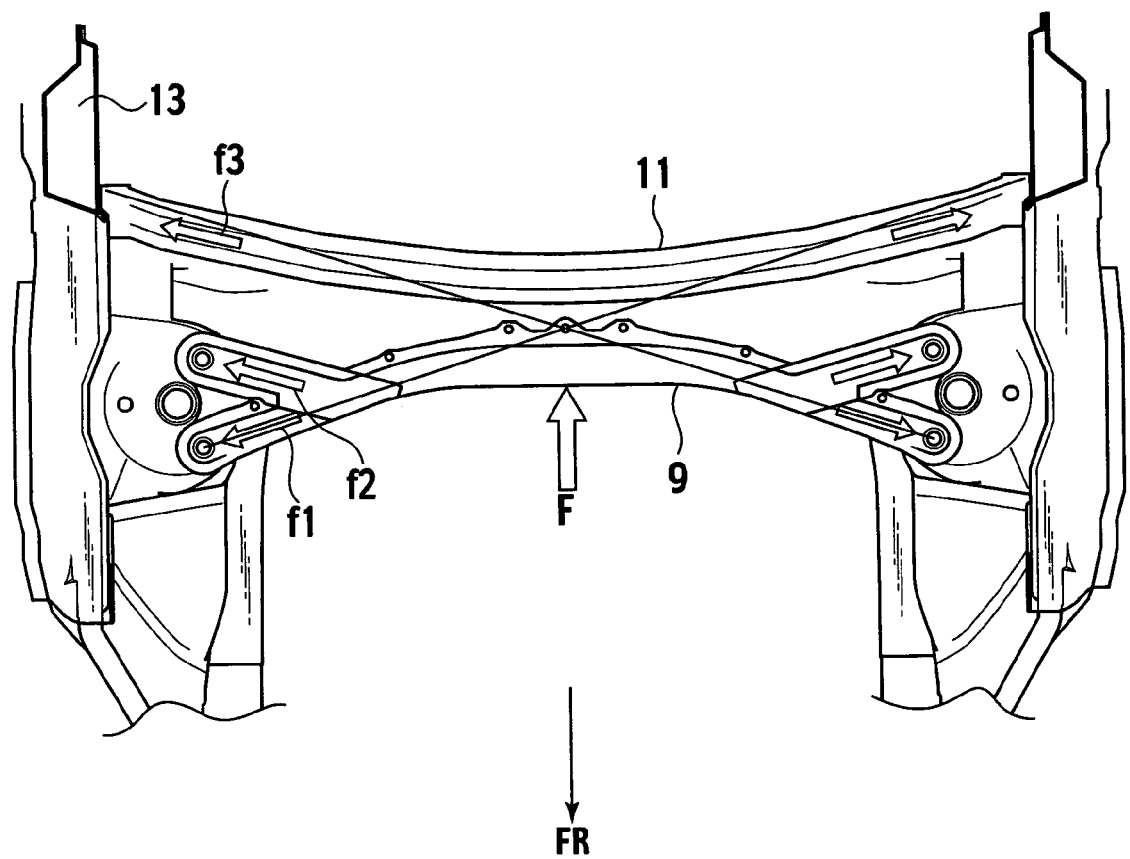
FIG. 5 is a plan view schematically showing a load transfer path when a load is exerted onto the front portion of the vehicle having the vehicle front body structure according to the embodiment of the invention.

As shown in FIG. 5, in the case where the vehicle encounters the front-end collision and the like, the load F is exerted to the cowl top extension 9 from the front of the vehicle. The load F is then transferred to the top 7 of the strut tower 5 via the branching portion 17 of the cowl top extension 9, and distributed as loads f1 and f2. More specifically, the load f1 is exerted to the front attachment 19 of the cowl top extension 9, and the load f2 is exerted to the rear attachment 21, respectively, such that those loads f1, f2 are exerted to the top 7 of the strut tower 5.

Further the load F is transferred, as a load f3, from the central portion 25 of the cowl top extension 9 through the left and right end portions of the cowl box 11 to the left and right front pillars 13.

Functions and effects of the embodiment of the invention will be described below.

In the vehicle front body structure of the embodiment, both tops 7 of the left and right strut towers 5 are tied to each other by the cowl top extension 9, the cowl top extension 9 extends horizontally across the width of the vehicle at the height substantially the same as that of the top 7 of the strut tower 5, and the cowl top extension 9 is formed in a curved shape having the central portion 25 thereof in the transverse direction of the vehicle situated at the rear end thereof.

The structure in which the cowl top extension 9 extends at the height substantially the same as that of the top 7 of the strut tower 5 improves the strength an rigidity of the tied left and right strut towers, compared with the case where the connecting member is provided above the top of the strut tower, in which the connecting member is formed in a C shape in front view having upwardly extending legs fixed to the tops 7 of the strut towers and being connected to each other with a horizontal beam member at upper ends thereof, for example. Further, the cowl top extension 9 is formed in a frontwardly curved shape having a center of curvature at a point on the rear side thereof, whereby the space in front of the cowl top extension 9 in the engine room 3 is enlarged.

The cowl box 11 is provided to the rear of the cowl top extension 9, and the central portion 25 of the cowl top extension 9 is joined to the cowl box 11. This makes it possible to maintain high rigidity of the cowl top extension 9 even if it is curved rearwardly.

The cowl box 11 is formed in a curved shape having the central portion 11a in the transverse direction of the vehicle situated at the front end thereof. Therefore, in the case where the windshield 15 is slanted and the center lower portion thereof is pushed forward relative to the vehicle body at a front-end collision of the vehicle, the windshield 15 can be supported on the cowl box 11. The amount of the curvature of the cowl top extension 9, or the amount of offset in the longitudinal direction of the vehicle between the strut tower connecting portions A1, A2 and the cowl box connecting portion B is reduced. This improves the rigidity of the cowl top extension.

The cowl top extension 9 is formed to have a closed cross section 37, which further improves the rigidity of the cowl top extension 9.

The pillar connecting portions C1, C2 of the left and right end portions of the cowl box 11 are connected to the pillar members (front pillars 13). Accordingly, when the load is exerted to the cowl top extension 9 from the front of the vehicle, the load is efficiently transferred to the pillar member via the cowl box 11. This further improves the rigidity of the vehicle front portion.

The cowl top extension 9 is provided on the strut tower connecting portions A1, A2 at the left and right end portions thereof with the branching portions 17 having two transversely outwardly extending arms, each of which is fixed on the top 7 of the strut tower 5 at a transversely outer end portion thereof. If the load F is exerted to the cowl top extension 9 from the front of the vehicle, the load F is efficiently distributed to the branching portions 17 through both end portions of the cowl top extension 9 and transferred to the tops 7 of the strut towers 5. This makes it possible to further improve the rigidity of the front portion of the vehicle.

Further, the right strut tower connecting portion A1 of the cowl top extension 9, the cowl box connecting portion B of the cowl top extension 9, and the left pillar connecting portion C2 of the cowl box are in substantially a linear arrangement. Likewise, the left strut tower connecting portion A2 of the cowl top extension 9, the cowl box connecting portion B of the cowl top extension 9, and the right pillar connecting portion C1 of the cowl box are in substantially a linear arrangement. Accordingly, the load resulting from the inward flexing of the strut tower 5 is efficiently transferred through the high rigidity members of the cowl top extensions 9 and the cowl box 11 to the pillars 13. This improves the supporting rigidity against the load from the suspension during traveling of the vehicle.

The preferred embodiment described herein is illustrative and not restrictive, and the invention may be practiced or embodied in other ways without departing from the spirit or essential character thereof. The scope of the invention being indicated by the claims, and all variations which come within the meaning of claims are intended to be embraced herein.

The present disclosure relates to subject matters contained in Japanese Patent Application No. 2005-028854, filed on Feb. 4, 2005, the disclosures of which is expressly incorporated herein by reference in its entirety.

What is claimed is:

1. A front body structure for a vehicle comprising:
   a cowl box extending in a transverse direction of the vehicle and having a curved shape with a central portion of the cowl box in the transverse direction of the vehicle situated at a front end of the cowl box; and
   a connecting member tying tops of strut towers, extending in front of the cowl box at a height substantially equal to that of each of the tops of strut towers, and having a curved shape with a central portion of the connecting member in the transverse direction of the vehicle situated at a rear end of the connecting member, wherein the connecting member is connected to the cowl box at the central portion of the connecting member.

2. The front body structure according to claim 1, wherein the cowl box is connected at end portions of the cowl box to pillar members; and
   a portion at which the connecting member is connected to one of the strut towers on one side of the vehicle in the transverse direction of the vehicle, a portion at which the connecting member is connected to the cowl box, and a portion at which the cowl box is connected to one of the pillar members on another side of the vehicle in the transverse direction of the vehicle are arranged on substantially a same straight line.

3. The front body structure according to claim 1, wherein the connecting member is formed to have a closed cross section.

4. The front body structure according to claim 1, wherein the connecting member is formed to have at end portions of the connecting member a plurality of branching arms, each of which extends outward in the transverse direction of the vehicle and is fixed at a respective end of the connecting member to respective tops of strut towers.

5. The front body structure according to claim 1, wherein the front end of the cowl box and the rear end of the connecting member generally arc towards each other, wherein the rear end of the connecting member is located further towards a rear of the vehicle than another section of the connecting member, and wherein the front end of the cowl box is located further towards a front of the vehicle than another section of the cowl box.

* * * * *